United States Patent [19]

Truax

[11] Patent Number: 5,486,554

[45] Date of Patent: Jan. 23, 1996

[54] METHOD AND APPARATUS FOR TREATMENT OF ASPHALT AND SYNTHETIC RESINS

[75] Inventor: Daniel A. Truax, Kansas City, Mo.

[73] Assignee: Ultra-Technologies, Inc., Kansas City, Mo.

[21] Appl. No.: 245,066

[22] Filed: May 17, 1994

Related U.S. Application Data

[63] Continuation of Ser. No. 41,289, Mar. 30, 1993, abandoned, which is a continuation-in-part of Ser. No. 891,408, May 29, 1992, abandoned.

[51] Int. Cl.$^6$ .............................. C08L 95/00; C08F 6/00
[52] U.S. Cl. ............................ 524/71; 524/59; 523/324; 528/499; 528/500; 528/501
[58] Field of Search .................................. 524/68, 71, 59; 528/499, 500, 501; 523/326, 324

[56] References Cited

U.S. PATENT DOCUMENTS

| | | | |
|---|---|---|---|
| 442,298 | 12/1890 | Wiselogel | 422/189 |
| 1,332,359 | 3/1920 | Rosenbaum | 208/428 |
| 1,758,913 | 3/1930 | Sadtler | 404/81 |
| 1,884,240 | 10/1932 | Rhodes et al. | 524/66 |
| 2,686,166 | 8/1954 | Taylor | 260/28.5 |
| 2,802,843 | 8/1957 | Tramm et al. | 422/196 |
| 2,853,742 | 9/1958 | Dasher | 18/48 |
| 2,890,999 | 6/1959 | Polack | 422/189 |
| 2,963,415 | 12/1960 | MacDonald | 208/39 |
| 3,024,280 | 3/1962 | Braun | 260/555 |
| 3,254,045 | 5/1966 | Sinclair | 524/71 |
| 3,308,209 | 3/1967 | Freeman | 260/978 |
| 3,423,176 | 1/1969 | Kabisch et al. | 23/207 |
| 3,511,769 | 5/1970 | Corbett | 208/39 |
| 3,891,585 | 6/1975 | McDonald | 260/28.5 |
| 3,919,072 | 11/1975 | Pitchford et al. | 208/4 |
| 3,919,148 | 11/1975 | Winters et al. | 260/285 AS |
| 4,069,182 | 1/1978 | McDonald | 260/28.5 AS |
| 4,206,302 | 6/1980 | Pollozec et al. | 536/35 |
| 4,415,702 | 11/1983 | Ono et al. | 524/705 |
| 4,430,464 | 2/1984 | Oliver | 524/59 |
| 4,750,984 | 6/1988 | Ott | 208/39 |
| 4,769,288 | 9/1988 | Saylak | 428/403 |
| 4,793,730 | 12/1988 | Butch | 404/77 |
| 4,832,747 | 6/1989 | Marchal | 106/277 |

FOREIGN PATENT DOCUMENTS

| 0439232 | 7/1991 | European Pat. Off. | 524/71 |
|---|---|---|---|

OTHER PUBLICATIONS

An article from a Nov. 1969 publication–The Municipal South, entitled "Sealing and Patching Streets and Highways": by Ladis H. Csanyi concerning the production and application of foamed asphalt.

A paper entitled Foamed Asphalt in Oklahoma: A Beginning, by C. Dwight Hixon and E. B. Kidd, II, published by the Research and Development Division, Oklahoma Department of Transportation dealing with the field application of foamed asphalt.

A collection of documents comprising the pages dealing with foamed asphalt applications, including a letter dated Nov. 10, 1981, and attached report from the Department of Transportation, State of Maine, concerning a failed field trial on a foamed asphalt application, a form letter from Ultra–Technologies, Inc. describing a foamed asphalt system under the trademark ASFOAM with attached page entitled "How ASFOAM works", a CONOCO Newsletter dated Nov. 20, 1980 setting forth papers on FOAMIX pavements, sales material and invoice for an Ultra–Technologies LTU1 foamed asphalt lab test unit including a sketch, component reference, and photograph of a foamed asphalt particle.

Conoco Newsletter, Nov., 1980; Ref.: 80–55 re Foamix Update.

Conoco Newsletter, Aug., 1980; Ref.: 80–54 re Foamix Update.

Coanyl; Sealing and Patching Streets and Highways, The Municipal South, Sep., 1960, pp. 19–22.

Abel, Foamed Asphalt Base Stabilization; Sixth Annual Asphalt Paving Seminar, Dec. 7–8, 1978: Colorado State University.

Hixon, et al.; Foamed Asphalt in Oklahoma: A Beginning; Feb., 1981; Oklahoma Department of Transportation.

Primary Examiner—Paul R. Michl
Assistant Examiner—Lavonda R. Dewitt
Attorney, Agent, or Firm—Hovey, Williams, Timmons & Collins

[57] ABSTRACT

A low cost method for preparing foamed or aerated asphalt-rubber paving compositions is provided wherein a flowable mixture including respective quantities of asphalt and finally divided reclaimed rubber particles is first directed into a rocket-type reactor along with steam and/or water, thereby subjecting the mixture to conditions of elevated temperature, pressure and shear. Thereafter, the initially reacted mixture is passed into a pressurized, secondary reaction vessel system in order to complete the gelation reaction in a period of, e.g., 7– 15 minutes. The preferred apparatus (10) includes a rocket-type primary reactor (12) presenting a confined reaction zone (20); asphalt-rubber and water/steam conduits (42, 48) communicate with the zone (20). The output (24) of the primary reactor (12) feeds directly into a pressurized tank (66) forming a part of the downstream secondary reaction and recovery system (14), where the gelation reaction is completed. The preferred system (14) includes a total of five serially interconnected tanks (66–74) housed within an insulative shell (108) and heated by means of burner (110).

20 Claims, 3 Drawing Sheets

METHOD AND APPARATUS FOR TREATMENT OF ASPHALT AND SYNTHETIC RESINS

This application is a continuation of Ser. No. 08/041,289, filed Mar. 30, 1993, now abandoned, which is a continuation-in-part of Ser. No. 07/891,408, filed May 29, 1992, now abandoned.

BACKGROUND OF THE INVENTION

1. Field of the Invention

The present invention is broadly concerned with a method for preparing an asphalt composition useful for paving or road repair, and in particular, gelled asphalt-rubber compositions which provide an elastomeric matrix which has been found especially useful in paving applications while also reducing the solid waste problems attendant to disposal of used automotive tires. The invention also comprehends an improved, quick reaction time apparatus for the production of such gelled asphalt-rubber compositions which can if desired be of modular, mobile design permitting transport of the apparatus to a convenient location. In addition, the invention includes a method and apparatus for the preparation of foamed mixtures containing either asphalt and synthetic resin (e.g., polyethylene or polyethylene terephalate) or synthetic resin alone.

2. Description of the Prior Art

U.S. Pat. No. 3,891,585, describes elastomeric, gelled asphalt-rubber paving compositions which are made up of reacted fractions of paving grade asphalt and reclaimed rubber particles. These types of paving composition have proven to be very useful and successful, both in terms of wear characteristics and by virtue of the fact that manufacture thereof uses reclaimed rubber derived from used automotive tires. The latter factor is important inasmuch as such tires present a considerable solid waste problem, and their use in asphalt compositions provides both an economic and environmental advantage. Indeed, recent legislation has mandated that by 1997, at least 20% of federally funded highway asphalt paving projects will make use of asphalt-rubber.

As described in the '585 patent, paving grade asphalt is first heated to a temperature of from about 350°–500° F., followed by the addition of particulate rubber thereto. The resulting mixture is then thoroughly mixed in an atmospheric pressure mixer until the composition gels and is ready for mixing with aggregate. Generally speaking, the known process for obtaining asphalt-rubber compositions involves a reaction time on the order of 30–45 minutes with continuous agitation, until a dramatic viscosity change occurs, signalling that the gelation has developed. In order to obtain an essentially continuous output of gelled product, it is generally necessary to employ a series of large (4,500 gallon) agitated tanks, which represents a considerable cost. In addition, the gelled product is not storable, and therefore must be essentially produced on site. As a consequence, it is necessary to have the large mixing tanks on mobile platforms, which further increases costs.

It has also been known in the past to prepare foamed asphalts. Such materials are typically produced by injecting hot asphalt cement and cold water into an agitator containing cold wet aggregate. The asphalt remains in a foam state for a relatively short period of time (15–60 seconds) and is sprayed into the aggregate mixer. The resultant asphalt-aggregate mixture is then ready for storage or placement on a roadway. Foamed asphalts have also been produced by use of a rocket-type reactor feeding into an aggregate tank. In such a rocket-type reactor, respective streams of asphalt and water or steam are directed into a confined reaction zone where relatively high temperatures and pressures are generated, thereby creating a foamed product. The output from the rocket-type reactor is then applied to aggregate in the usual fashion. While foamed asphalts are advantageous, they do nothing to alleviate the solid waste problem of used automotive tires.

Modern industrial societies also generate tremendous quantities of scrap plastic or synthetic resin materials such as polyethylene (both high and low density) and polyethylene terephalate. It would be a material advancement in the art to provide a method and apparatus for reusing and reclaiming these plastics, either in the context of a foamed asphalt or as a foamed mixture per se.

SUMMARY OF THE INVENTION

The present invention overcomes the problems outlined above, and provides a greatly improved method for preparing asphalt-rubber paving compositions with relatively small equipment and capital costs. Broadly speaking, the method of the invention includes the steps of first forming a preferably flowable mixture including respective quantities of asphalt and finely divided reclaimed rubber particles, whereupon the mixture is fed into a rocket-type reactor presenting a confined reaction zone. Water and/or steam is simultaneously directed into the reactor zone so that the mixture is subjected to conditions of elevated temperature, pressure and shear to aerate the mixture. The aerated product from the confined reaction zone is then passed directly into a secondary reaction vessel under superatmospheric pressure conditions which are below that of the confined reaction zone of the primary reactor. The aerated mixture is retained within the secondary reaction vessel for a time sufficient to assure gelation of the mixture. At this point, the gelled mixture may be recovered and mixed with aggregate to form a complete paving composition.

The present invention permits use of relatively small-sized equipment, as compared with prior techniques. Thus, continuous output may be maintained using a primary rocket-type reactor together with relatively small, secondary downstream pressurized reactor(s), as opposed to the large, atmospheric pressure agitated tanks characteristic of the prior art.

In preferred forms, the apparatus includes a primary reactor defining a confined superatmospheric reaction zone with respective input conduits in communication with the confined reaction zone for simultaneously directing into the zone a preferably flowable mixture of asphalt and finely divided reclaimed rubber particles, and water or steam. An output conduit also communicates with the secondary reaction zone for delivery of aerated product. The overall apparatus further includes at least one secondary pressurized reaction vessel having a volume substantially greater than that of the primary confined reaction zone and operable for maintaining a pressure therein which is above atmospheric but below the pressure conditions achieved in the primary reaction zone. The output conduit of the primary reactor communicates directly with the secondary reaction vessel so as to maintain the aerated mixture under pressure until the gelation reaction is essentially complete. This reaction is further enhanced by provision of means for heating the downstream pressurized reaction vessel(s).

In practice, complete gelation and formation of asphalt-rubber composition may be achieved using retention times in the secondary reaction vessel of from about 5–20 minutes, and more preferably from about 7–15 minutes. Accordingly, continuous output of completed asphalt-rubber composition may be obtained using significantly smaller equipment as compared with the prior art. This makes it easier to render the entire system mobile, and also of course substantially reduces capital outlay.

The present invention also comprehends a method and apparatus for the reaction of asphalt and a synthetic resin, such as scrap polyethylene and polyethylene terephalate, or alternately for the reaction of such synthetic resins alone. As described previously, the method involves directing a mixture of the synthetic resin material (which would typically be in solid scrap form) with or without premixing with asphalt into a confined reaction zone simultaneously with a stream of steam and/or water under conditions of elevated temperature, pressure and shear as defined above to agitate and foam the starting materials. The agitated mixture is then fed to a pressurized reaction vessel and reacted therein for a time sufficient to insure creation of a substantially homogeneous mixture, which can then be recovered. Conditions within this downstream reaction zone are preferably the same as those employed in the creation of the foamed rubber asphalt compositions described previously.

DETAILED DESCRIPTION OF THE PREFERRED EMBODIMENTS

Turning now to the drawings, apparatus 10 for the production of foam or aerated asphalt-rubber compositions broadly includes a primary rocket-type reactor 12, as well as a multiple-tank secondary reaction and recovery system 14, the latter terminating in an output conduit line 16 for finished product.

Figure 3:
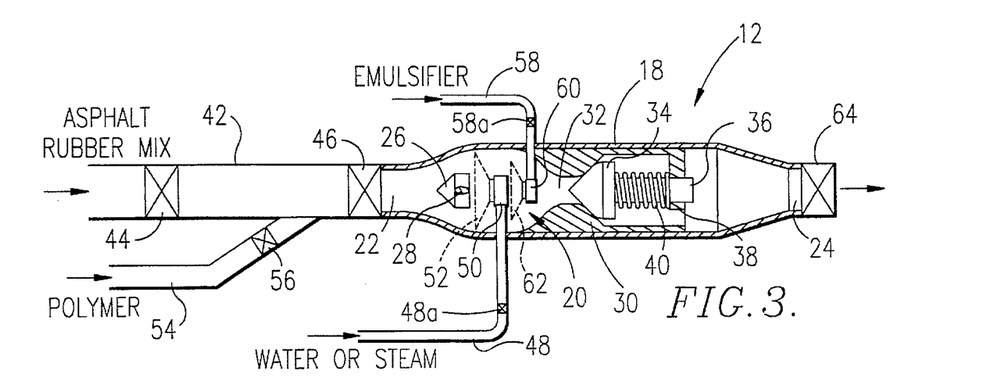
FIG. 3 is a schematic sectional view depicting the preferred primary rocket-type reactor forming a part of the apparatus.

In more detail, the primary reactor 12 includes an elongated, tubular body 18 presenting a confined reaction zone 20 as well as an input end 22 and output end 24. A conical flow-diverter 26 is positioned adjacent the input throat of zone 20, and is supported therein by a pair of vanes 28. An annular, inwardly extending protrusion 30 is also provided downstream of diverter 26 and defines a restricted outlet throat 32. As illustrated, a generally conical check valve member 34 is positioned to mate with the downstream face of protrusion 30 remote from zone 20, and has a rearwardly extending, shiftable shaft 36. The latter is mounted within housing 18 for axial movement thereof, by provision of an apertured support 38. A coil spring 40 is disposed about shaft 36 between support 38 and the rear face of member 34, in order to bias the latter into engagement with protrusion 30.

A first input conduit 42, equipped with a pair of conventional check valves 44, 46 and an upstream pump 47 (FIG. 2), is secured to input end 22 of body 18 and communicates with reaction zone 20. The conduit 42 is sized to receive and convey an incoming mixture of rubber and asphalt as illustrated in FIG. 3.

A second water and/or steam input conduit 48, having a check valve 48a, a pump 49 and valve 49a therein, extends through housing 18 as shown and directly into the zone 20 downstream of diverter 26. A nozzle 50 is coupled to the end of conduit 48 within the zone 20, and serves to create a generally conical flow pattern 52 for incoming water and/or steam.

In certain cases, it is desired to inject various known asphalt additives during the production of a complete asphalt-rubber composition. To this end, a polymer injection conduit 54, having a check valve 56 therein, is provided which communicates with input conduit 42 between check valves 44 and 46. Known additive polymers for influencing the final characteristics of asphalt-rubber compositions may be injected through this line. Similarly, an emulsifier injection conduit 58 having check valve 58a therein is also provided, the latter extending through body 18 and into reaction zone 20 downstream of the water and/or steam conduit 48. A nozzle 60 is secured to the innermost end of conduit 58, so as to produce a conical spray pattern 62 of emulsifier within the zone 20. Any one of a number of known detergent-type emulsifiers may optionally be injected via the conduit 58.

Figure 1:
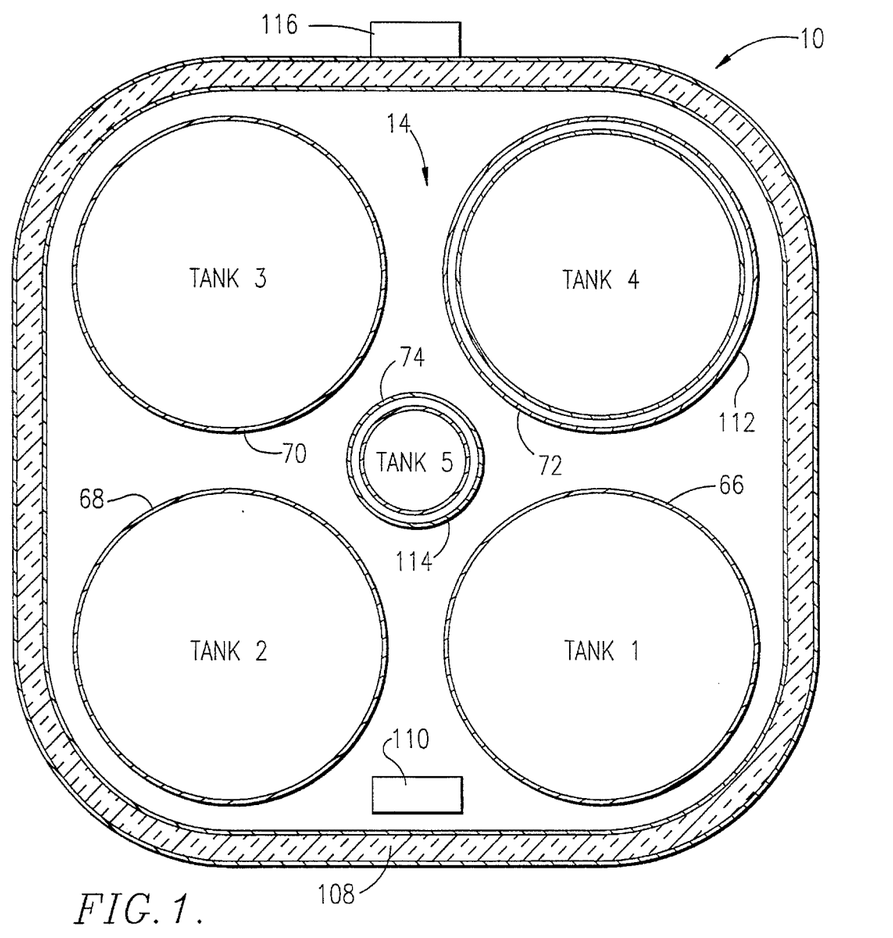
FIG. 1 is an essentially schematic cross-sectional view of a multiple-tank reaction apparatus for the production of foamed or aerated asphalt-rubber compositions in accordance with the invention.

The output end 24 of reactor body 18 feeds directly into the reaction/recovery system 14, and to this end a conventional check valve 64 is situated within end 24. As indicated previously, the reaction and recovery system 14 is designed to complete the gelation reaction initiated in primary reactor 12, in a time significantly less than that characteristic of prior art systems.

Figure 2:
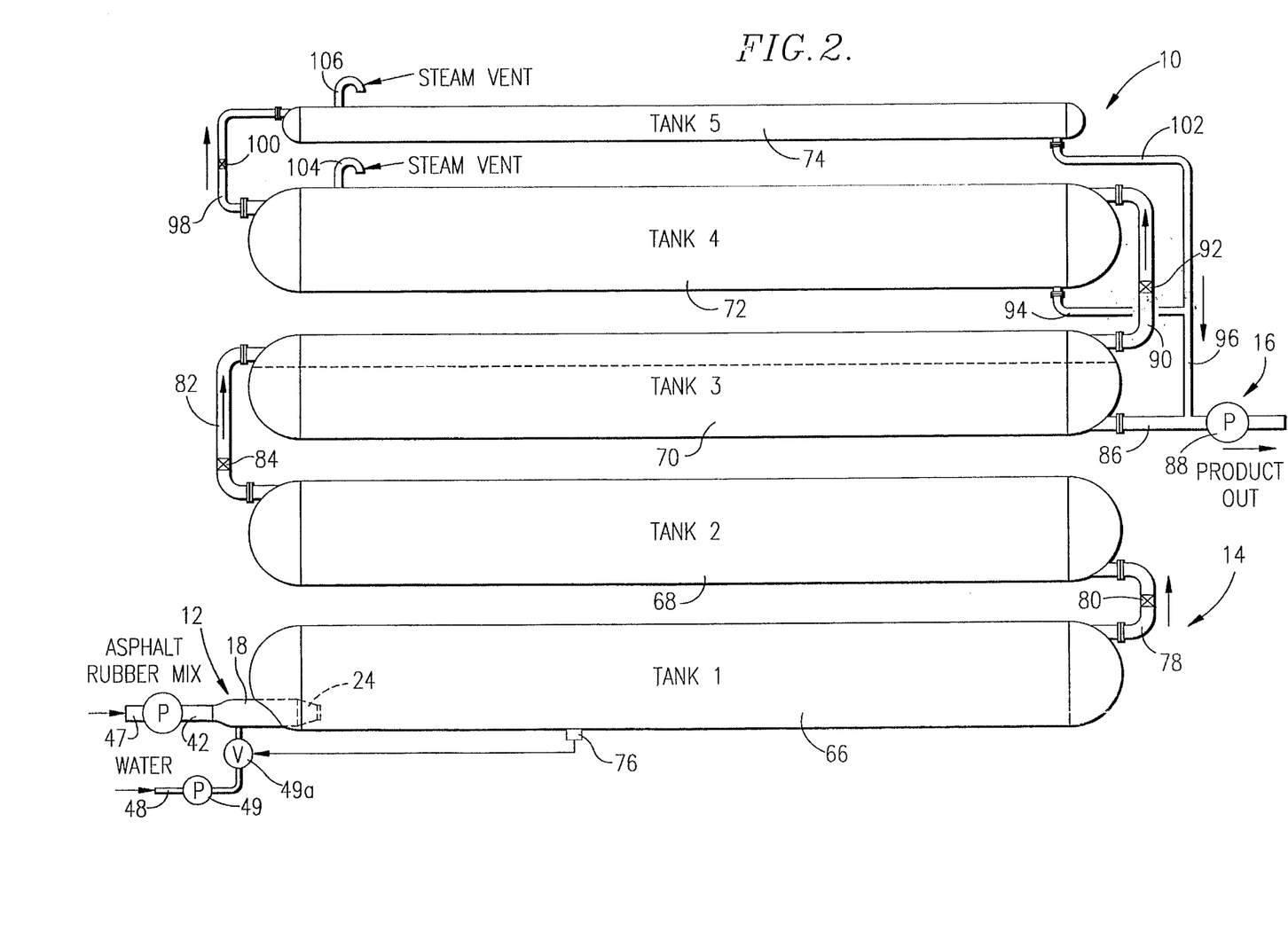
FIG. 2 is a schematic view illustrating the interconnection of the multiple tanks in the apparatus of FIG. 1.

In detail, the system 14 in the embodiment illustrated includes a total of five serially interconnected tanks 66, 68, 70, 72, 74, labeled tank 1-tank 5 in FIGS. 1 and 2, with primary reactor 12 feeding directly into tank 66. The tank 66 is a pressure vessel, and is designed to maintain a pressure therein above atmospheric but below that attained in primary reaction zone 20. A sensor 76 is operatively coupled with tank 66 and controls input valve 49a within water and/or steam line 48. Thus, greater or lesser amounts of steam and/or water may be delivered to primary reactor 12, depending upon the desired pressure conditions to be maintained within tank 66.

Tanks 66, 68 are connected by means of a pipe 78 having a check valve 80 and a pressure relief valve (not shown) therein. Normally, the pipe 78 is connected between the top of tank 66 and the bottom of tank 68. A delivery pipe 82 having check valve 84 and a pressure relief valve (not shown) therein interconnects tanks 68 and 70. Again, the pipe 82 is connected between the top of tank 68 and the bottom of tank 70.

Tank 70 is equipped with a product output line 86 extending from the bottom thereof and having a pump 88 interposed therein. In addition, a pipe 90 having check valve 92 therein is connected between the upper portions of tanks 70 and 72. The tank 72 has a product output line 94 extending from the bottom thereof and communicating with the pipe 96 leading to line 86. A pipe 98 having check valve 100 therein is similarly interconnected between the upper portions of tanks 72 and 74; and a product delivery pipe 102 extends from the bottom of tank 74 and communicates with pipe 96. Each of the tanks 72, 74 is equipped with a steam vent 104, 106 as shown.

In order to provide the requisite degree of heating of the respective tanks 66–74 and to orient the latter in the most efficient, space-saving manner, it is preferred that the tanks be stacked as shown in FIG. 1 and housed within an insulative shell 108. A gas-fired burner 110 is operatively positioned within the shell 108 in order to heat the tank 66–74. In addition, the tanks 72 and 74 are advantageously provided with external jackets as at 112 and 114, together with appropriate inputs and outputs (not shown) permitting circulation of hot oil within the jackets and consequent further heating of these tanks; the hot oil can also be used to heat product transfer lines as necessary. A vent 116 is also provided at the top of shell 108, to permit discharge of combustion gases generated by burner 110. Of course, the steam vents 104, 106 would also pass through the shell 108.

In the operation of apparatus 10, a heated mixture of rubber and asphalt is first prepared and delivered via conduit 42 into primary reactor 12. This flowable mixture is preferably made up of paving grade asphalt having a penetration number of from about 10–300, and more preferably from about 60–300. The rubber fraction is advantageously made up of reclaimed rubber particles derived from used automotive tires, and is preferably ground to a maximum average size which will pass through an 8-mesh screen. More preferably, the average particle size is sufficient to pass through a 10-mesh screen. The asphalt-rubber mixture is normally constituted with asphalt being the predominant (i.e., greater than 50% by weight) fraction, but can range from about 1–30% by weight rubber and from about 79–99% by weight asphalt. More typically, however, the mixture comprises from about 75–85% by weight asphalt and correspondingly from about 15–25% by weight reclaimed rubber particles. If additives such as polymer and/or emulsifier are employed, these are normally used in very minor proportions on the order of 1% or 4% by weight.

The asphalt-rubber mixture is preferably heated to a temperature of from about 280°– 700° F., more preferably from about 300°–525° F. and most preferably from about 325°–425° F. prior to entrance into primary reactor 12. This preliminary mixing and heating need be sufficient to render the mixture flowable and to enhance foaming; generally, temperatures should be on the order of 325° or greater.

As the asphalt-rubber mixture passes through check valve 46 and into reaction zone 20, water and/or steam is simultaneously directed via conduit 48 into the zone. Preferably, water is injected at a level of from about ¼–2% by volume of the incoming asphalt-rubber mixture, this being controlled by sensor 76 and valve 49a. By virtue of the temperature of the incoming asphalt-rubber mixture, as well as the heat generated through burner 110, the injected water is quickly vaporized as steam. This subjects the initial flowable mixture to conditions of elevated temperature, pressure and shear, and this effectively agitates the mixture. Generally, the incoming flowable mixture is subjected to a temperature of from about 300°–700° F., and more preferably from about 325°–425° F. in the reaction zone 20, and most preferably from about 400°–425° F. Pressure conditions are typically in the range of from about 100–800 psi. A narrower range would be from about 300–600 psi, and more preferably from about 200–400 psi, and most preferably from about 200–300 psi. As those skilled in the art will appreciate, the check valve member 34 abutting protrusion 30 serves to assure generation of sufficient reaction pressures within the zone 20, but this valve member is opened as the pressure developed is sufficient to overcome the bias of spring 40, allowing the mixture to pass through and out of the primary reactor 12.

As the agitated mixture passes through check valve 64, it enters the initial tank 66. This tank 66 (and normally tank 68) are designed to maintain super-atmospheric pressure conditions somewhat below those generated in primary reaction zone 20. In typical operation, the pressure conditions within tank 66 would be on the order of 225 psi, with sensor 76 serving to monitor this pressure and operate water and/or steam valve 49a in the manner described above. The mixture is retained within the reaction vessel 66 for a period of from about 3–15 minutes, and more preferably from about 6–11 minutes. Normally, the tank 66 remains full of product, so that the mixture passes out of tank 66 and into tank 68 via pipe 78. The tank 68 is likewise normally maintained in a full condition so that product may readily pass therefrom via pipe 82. The residence time of material within tank 68 is normally on the order of from 3–15 minutes, and more preferably from about 6–10 minutes. The pressure relief valves interposed within the pipes 78 and 82 provide a further measure of pressure control within the tanks 66 and 68.

The gelation reaction is normally completed within tank 70, which is usually maintained at atmospheric pressure, and is not completely full of product as shown by the dotted line in FIG. 2. The residence time of the mixture within tank 70 is from about 3–7 minutes, and more preferably from about 4–5 minutes. The bulk of finished product from the system 14 passes out of tank 70 through line 86 as shown.

The overhead from tank 70 passes through pipe 90 into the first evaporation tank 72, which is likewise maintained at atmospheric pressure. A portion of the gaseous overhead is collected as liquid product in the bottom of tank 72, and passes by means of pipe 94 as finished product. In like manner, the overhead from tank 72 passes to final evaporation or dryer tank 74 where the final residuum of product is collected and passed through pipe 102 as output. Steam is vented from the tanks 72, 74 through the corresponding vents 104, 106.

The total residence time of product within the reaction and recovery system 14 is normally on the order of 1–20 minutes, and more preferably from about 5–20 minutes. The temperature of the product passing through the system 14 is normally maintained at a temperature of from about 300°–700° F., and more preferably from about 325°–425° F. by means of the burner 110. The short-time reaction conditions possible through the use of the present invention represent a considerable economic advantage. In the first place, shorter reaction times translate into smaller equipment requirements and thus lower costs to achieve the same output rate. This in turn means that the smaller equipment can more readily be truck-mounted for ease of transportation and use on site. Indeed, the preferred apparatus of the present invention is admirably suited for mounting on a conventional trailer. At the same time, the product output is in every way a top quality foamed asphalt-rubber which can readily be mixed with aggregate for use in paving.

Figure 4:
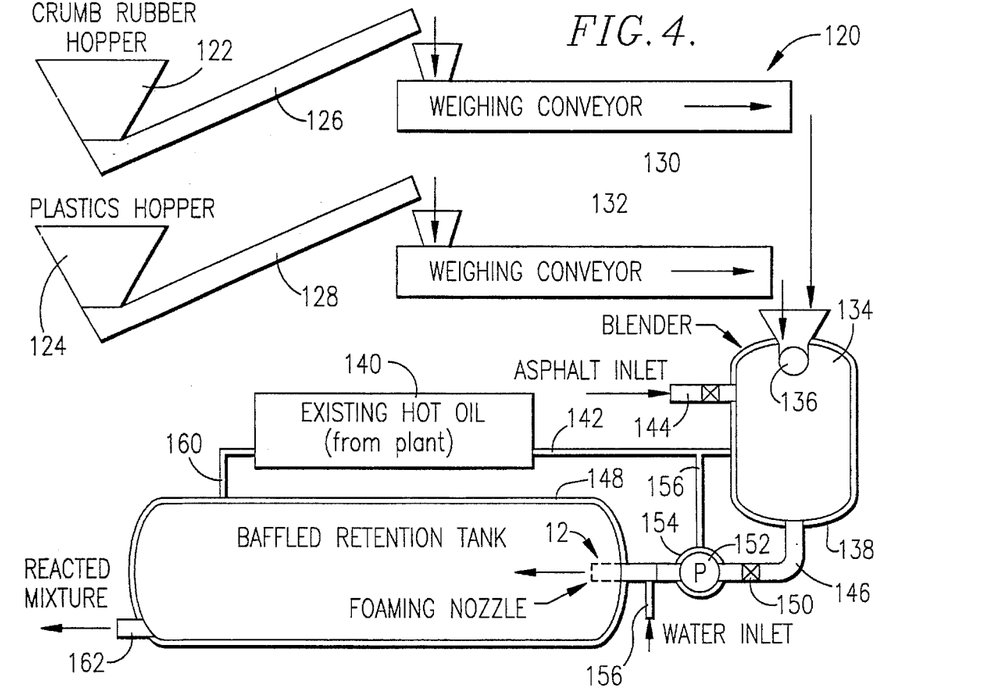
FIG. 4 is an essentially schematic view illustrating a preferred, multiple-use reaction apparatus in accordance with the invention.

Turning now to FIG. 4, a preferred apparatus 120 for the production of foamed asphalt rubber, asphalt-synthetic resin mixtures, or synthetic resin mixtures without asphalt is illustrated. The apparatus 120 includes a pair of hoppers 122, 124 respectively adapted to receive reclaimed crumb rubber and scrap synthetic resin (plastic) material. Each of the hoppers includes a conveyor 126, 128 coupled to the underside thereof, which feeds respective weighing conveyors 130, 132. The ends of the conveyors 130, 132 remote from the hoppers feed into a blender 134 equipped with a horizontal distribution auger valve 136 and internal static or dynamic mixing components (not shown). The blender 134 is provided with an exterior shell 138 for indirect heating of the contents thereof, with the shell 138 being operatively coupled with an existing hot oil system 140 via conduit 142. In addition, the interior of blender 134 is coupled by way of a valved inlet pipe 144 with a source of hot, flowable asphalt.

The blender 134 is also connected by means of an outlet pipe 146 with a baffled, shell-type retention tank 148. As illustrated, the pipe 146 is equipped with a valve 150 and product pump 152, the latter also being equipped with an external shell 154 for indirect heating of the pump during operation thereof. In addition, a water inlet pipe 156 is connected to the pipe 146 intermediate pump 152 and tank 148. A reactor 12 of the type described with reference to FIGS. 1 and 3 is situated within tank 148 and communicates with pipe 146. Hot oil lines 158, 160 extend from conduit 142 and system 140 for the purpose of supplying hot oil to the shells surrounding tank 148 and pump 154, as shown. Finally, the tank 148 is provided with an outlet pipe 162 for conveying reacted materials from the tank.

In the use of apparatus 120 for the creation of a foamed rubber asphalt mixture, the asphalt and reclaimed rubber are first delivered to blender 134 in the proportions indicated previously, and are premixed therein. The hot oil system 140 also serves to elevate the temperature of the asphalt/rubber blend, typically to a level of from about 300°–700° F. The asphalt/rubber blend is mixed within the blender 134 for a period of from about 1–10 minutes, and more preferably from about 2–5 minutes. The material then exits the blender via pipe 146 and passes into and through the reactor 12. This serves to subject the mixture to conditions of elevated temperature, pressure and shear, exactly as described previously in terms of reaction conditions. The material is then fed from the reactor 12 into the reaction retention tank 148, where it is maintained for a time sufficient to insure homogeneity. Generally speaking, the retention time within tank 148 will range from about 1–20 minutes, more preferably from about 3–10 minutes. The baffles within the retention tank 148 assist in formation of a fully homogeneous final mixture.

The apparatus 120 can also be used in the formation of asphalt/synthetic resin mixtures, where the synthetic resin is preferably selected from the group consisting of polyethylene and polyethylene terephalates. In such cases, the synthetic resin material (typically, polymers or copolymers having a melting point of about 700° F. or less) is delivered via the conveyors 128, 132 to the blender, along with asphalt. The ratio of asphalt to plastic material will preferably be in the range of 80–97% by weight asphalt and from about 3–20% by weight synthetic resin material. The incoming components are mixed within blender 134 for a period of from about 1–10 minutes, and the hot oil system 140 is used to elevate the temperature of the mixture therein to a temperature of from about 300°–700° F.

The preblended mixture is then fed via pipe 146 into and through reactor 12. The reaction conditions within the reactor 12 should generally be as follows: temperature, from about 300°–700° F.; pressure, from about 50–300 psi; and residence time from about 1–5 seconds. The material from reactor 12 is then fed into retention tank 148, where it is held for a period of from about 1–20 minutes. Temperature conditions should be such as to create within the retention tank a product temperature of from about 325°–700° F. The final asphalt/synthetic resin product can then be conveyed via pipe 162 for use.

Finally, apparatus 120 can also be used in the preparation of reactive synthetic resin mixtures, without asphalt addition. In such a case, the synthetic resin is fed into blender 134, and is preliminarily mixed and softened therein. Temperature conditions are from about 280°–700° F. in the blender 134 are appropriate, together with a residence time of from about 1–30 minutes. After this preliminary blending, the softened material is fed via pipe 146 into reactor 12, along with water from pipe 156. This serves to fully melt, agitate and react the synthetic resin material, which is then expelled into the retention tank 148. The reaction conditions within the reactor 12 should be on the order of from about 300°–700° F., with a retention time from about 1–5 seconds, and a pressure of from about 50–300 psi. On the other hand, conditions within tank 148 should be in the range of from about 300°–700° F., and a pressure of from about 50–290 psi. Normally, the reacted synthetic resin material would have a residence time of from about 4–20 minutes within the tank 148.

Figure 5:
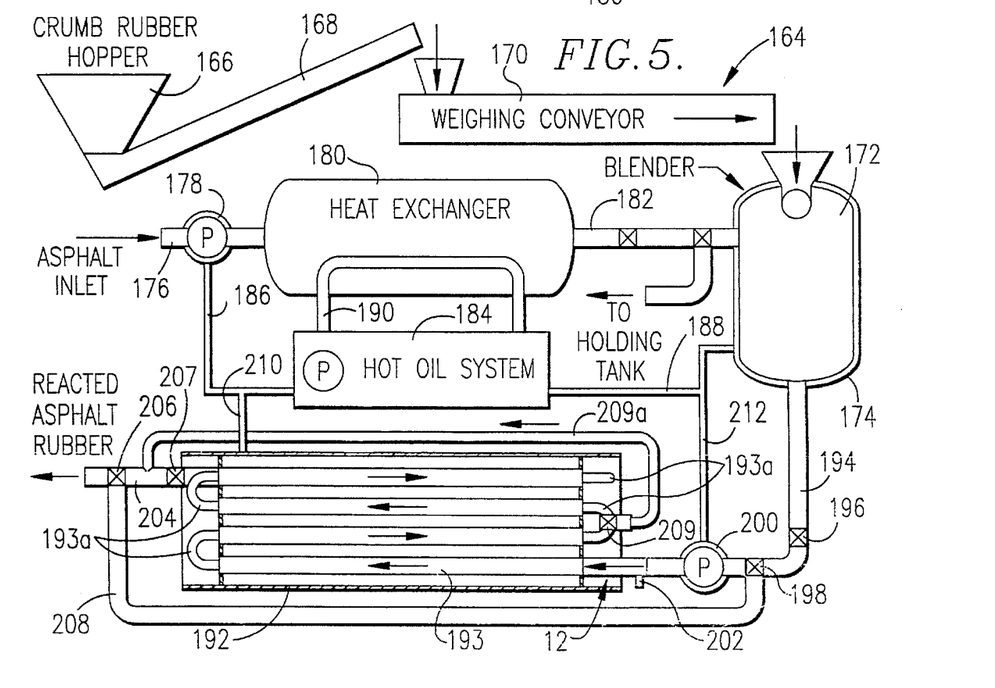
FIG. 5 is an essentially schematic view depicting another type of apparatus for the production of foamed rubber asphalt compositions.

FIG. 5 depicts another apparatus 164 in accordance with the invention, which is especially adapted for the production of foamed rubber asphalt mixtures. This apparatus includes a reclaimed rubber hopper 166 equipped with a conveyor 168 leading to a weighing conveyor 170. In addition, a blender 172, identical in all material respects with the blender 134, is oriented to receive the crumb rubber from conveyor 170. In this respect, it will be seen that the blender 172 is provided with an outer shell 174 for indirect heating purposes.

An asphalt inlet line 176 equipped with an indirectly heated pump 178 is coupled to an indirect heat exchanger 180, and the latter has a valved exit pipe 182 coupled to blender 172 as shown. A hot oil system 184 is provided for delivering hot oil via lines 186, 188 to the shell of pump 178 and shell 174 of blender 172. In addition, the hot oil system includes a conduit 190 associated with heat exchanger 180 for providing indirect heat to the latter. It will thus be appreciated that incoming asphalt passing through exchanger 180 is heated prior to entering blender 172.

The overall apparatus further includes an indirectly heated, multiple-pass reaction tank 192 equipped with a plurality of horizontal reaction pipes 193 interconnected via smaller diameter, endmost U-connectors 193a. The reactor 12 is connected to blender 172 by means of a conduit 194 equipped with check valves 196, 198 and indirectly heated pump 200. A water inlet 202 is connected to conduit 194 midway between pump 200 and reactor 12. The tank 192 is equipped with an outlet line 204 having valves 206, 207 therein; and a recirculation line 208 is provided between the valve 206 and valve 198. Additionally, in order to permit variations in reaction times, one of the U-connectors 193a is equipped with an check valve 209, the latter being connected to outlet line 24 via pipe 209a. In order to provide proper recirculation, the system 184 includes hot oil pipes 210, 212 respectively leading to the shells associated with tank 192 and pump 200.

The use of apparatus 164 in the production of foamed rubber asphalt is essentially identical to that described with reference to apparatus 120.

I claim:

1. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said rubber particles having a maximum average size which will pass through an 8-mesh screen.

2. The method of claim 1, said maximum average size which will pass through a 10-mesh screen.

3. The method of claim 1, including the step of directing water into said confined reaction zone in an amount of from about ¼–2% by volume of the amount of said mixture.

4. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture comprising from about 75–85% by weight asphalt, and from about 15–25% by weight reclaimed rubber particles.

5. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture having a temperature of from about 300°–700° F. prior to entrance thereof into said confined zone.

6. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture being subjected to a temperature of from about 300°–700° F. in said confined reaction zone.

7. The method of claim 6, wherein said temperature is from about 325°–425° F.

8. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi., to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said agitated mixture being retained in said reaction vessel for a period of from about 1–20 minutes.

9. The method of claim 8, said time being from about 5–20 minutes.

10. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture;

recovering said homogeneous mixture; and passing said agitated mixture from said confined reaction zones into and through a plurality of serially interconnected vessels while subjecting the agitated mixture to successively lower pressures until atmospheric pressure is reached.

11. The method of claim 10, including the steps of maintaining the agitated mixture at a temperature of from about 325°–425° F. during passage thereof through said serially interconnected vessels.

12. The method of claim 11, said temperature maintenance step comprising the step of heating each of said serially interconnected vessels.

13. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone simultaneously with a quantity of a stream of water and/or steam, and subjecting the mixture in said confined reaction zone to conditions of elevated temperature and shear, and to a pressure of from about 100–800 psi, to agitate and foam the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture;

recovering said homogeneous mixture; and venting moisture from said reaction vessel prior to recovery of said gelled mixture.

14. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said rubber particles having a maximum average size which will pass through an 8-mesh screen.

15. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture comprising from about 75–85% by weight asphalt, and from about 15–25% by weight reclaimed rubber particles.

16. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture having a temperature of from about 300°–700° F. prior to entrance thereof into said confined zone.

17. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said mixture being subjected to a temperature of from about 300°–700° F. in said confined reaction zone.

18. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture; and recovering said homogeneous mixture, said agitated mixture being retained in said reaction vessel for a period of from about 1–20 minutes.

19. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture;

recovering said homogeneous mixture; and passing said agitated mixture from said confined reaction zones into and through a plurality of serially interconnected vessels while subjecting the agitated mixture to successfully lower pressures until atmosphere pressure is reached.

20. A method of preparing an asphalt and/or synthetic resin composition comprising the steps of:

forming a mixture including at least one of: (1) asphalt and reclaimed rubber particles; (2) asphalt and synthetic resin having a melting point of about 700° F. or less; and (3) synthetic resin having a melting point of 700° F. or less;

directing said mixture into a confined reaction zone and subjecting the mixture in said confined reaction zone to conditions of elevated temperature and shear, and to a pressure of from about 100–800 psi, to agitate the mixture and render it flowable;

passing said agitated mixture from said confined reaction zone into a reaction vessel under pressure conditions above atmospheric but below the pressure of said confined reaction zone, and retaining the agitated mixture within said reaction vessel for a time sufficient to assure substantial homogeneity of the mixture;

recovering said homogeneous mixture; and venting moisture from said reaction vessel prior to recovery of said gelled mixture.

* * * * *